US005857668A

United States Patent [19]

Berry

[11] Patent Number: 5,857,668

[45] Date of Patent: Jan. 12, 1999

[54] TRUEBOARD PRESS FOR CUTTING DEVICE

[76] Inventor: William R. Berry, 21 South Oak Dr., Hanover, Ind. 47243

[21] Appl. No.: 719,892

[22] Filed: Sep. 25, 1996

[51] Int. Cl.$^{6}$ .............................. B23Q 3/02

[52] U.S. Cl. .............................. 269/91; 269/54.1; 269/239

[58] Field of Search .............................. 83/450, 451, 464, 83/466, 633, 634; 269/91–94, 54.1, 54.2, 54.3, 54.4, 237, 239

[56] References Cited

U.S. PATENT DOCUMENTS

| | | | |
|---|---|---|---|
| 822,166 | 5/1906 | Trembley | 269/54.1 |
| 1,742,059 | 12/1929 | Coulson | 269/54.1 |
| 2,726,693 | 1/1955 | Saxton . | |
| 3,298,097 | 1/1967 | Gilbert . | |
| 3,382,742 | 5/1968 | Gibbs . | |
| 4,112,793 | 9/1978 | Pierce . | |
| 4,213,364 | 7/1980 | Sahlin . | |
| 4,469,318 | 9/1984 | Slavic . | |

*Primary Examiner*—Robert C. Watson
*Attorney, Agent, or Firm*—David W. Carrithers

[57] ABSTRACT

An apparatus for pressing and holding wooden boards flat in straight alignment and to correct any warpage of the board to achieve a true cut with a radial arm saw, dado cutter, or other such wood cutting equipment.

15 Claims, 8 Drawing Sheets

TRUEBOARD PRESS FOR CUTTING DEVICE

BACKGROUND OF THE INVENTION

This invention relates to a new clamping device for holding a workpiece such as a wood board in a desired position during wood working operations using a radial saw, dado cutter, or the like. The present invention achieves the above objects by providing a means for holding pressure on the wood cutting piece as it moves through the radial saw to provide a finished cut which has a flush fit when nailed into place or positioned within precut slots formed for cooperative engagement therewith.

As shown in FIG. 1, often wooden boards are warped presenting a curved surface. In order to make a wooden piece for a piece of furniture, doll house, or other article which requires several precut wooden pieces to be fitted together, the individual wooden are measured and the parts are sawed from one or more boards. If the board is warped, the curvature of the wooden board workpiece may make an otherwise true measurement inaccurate as demonstrated in FIG. 1. In fact, a board which looks generally flat, may have a slight curvature which is enough to cause the cut piece to be too long when placed in to position in precision applications, which may be undetectable until the cut piece is held in a flat position by cutting, gluing, or other holding means. FIG. 1 shows a bowed board having a plurality of longitudinal spaced apart parallel grooves cut into the upper surface of a bowed board. Use of a radial saw cut grooves into the surface of the warped board at a deeper depth in the center grooved portion than at the grooved ends. The depth distance "a" at the groove ends is less than the depth distance "b" at the groove center because the saw blade of the radial saw cuts a straight preset depth along a selected horizontal plane through the upwardly curved or "bowed" plank. Moreover, the unequal depth of the grooves is the board may create stress lines or cracks when the cut workpiece is forced into compliance and close tolerance with a mating board by use of securing means.

Moreover, the use of conventional vices and clamping bolts is inconvenient and time consuming, while holding the work manually is very dangerous since some saw blades have a tendency to climb upon the workpiece rather than cut through, this being particularly true in dado operations wherein a bit is used to cut into the work piece a selected distance formed a groove or other such cut. The main danger occurs just as the edge of the blade contacts the workpiece, at which time there is a tendency for the workpiece to lift and move.

Accordingly, it is an object of the present invention to hold a workpiece flat in order to obtain a true cut through wood work products.

It is another object of the present invention to hold a workpiece securely preventing movement of the workpiece.

It is another object of the present invention to hold a workpiece flat and secure to enable a plurality of precision cuts to be formed in or through a workpiece so that no spaces are left between the boards being cooperatively fixed together.

It is another object of the present invention to hold a workpiece flat during the cutting operation in order to eliminate the stress placed upon a secured board.

It yet another object of the present invention to hold a workpiece flat providing a true cut and providing a precision fit in applications requiring that a bowed board be forced into compliance and close tolerance with a mating board by use of securing means.

SUMMARY OF THE INVENTION

The present invention achieves the above objects by providing a means for holding pressure on a wood cutting piece as it moves through the radial saw securely holding the workpiece flat to provide a finished cut which has a flush fit when secured into position such as by nailing, screws, adhesives, wood dowels, by friction fit or positioned within precut slots formed for cooperative engagement therewith.

The preferred embodiment for the trueboard press comprises a secured base member having a short vertical support member extending upwardly therefrom. A handle lever extends from a pivot attachment point at the top of the vertical support member. A pivoting press lever extends from the bottom of the vertical support member. A connecting rod means adjustably attaches the handle to the pivoting press lever which has a fulcrum press member extending downwardly therefrom for holding pressure against a piece of wood flattening the piece of wood between the fulcrum press member and the saw support frame correcting any warpage thereof in order to make a true and precision cut for obtaining accurate dimensions.

Moreover, the preferred embodiment of the present invention defines a trueboard press for a saw such as a radial arm saw, dado cutter or other type of radial arm type cutting device. The trueboard press apparatus comprises a base member, pivoting handle lever, pivoting press lever, connecting rod, and fulcrum press member.

The base member is secured to the top surface or a frame or working surface of a cutting device. The base member defines a flat plate, having a short base support member extending upwardly therefrom. The base support member of one preferred embodiment defines a pair of rectangular strips of metal spaced apart in alignment with one another forming a channel thereinbetween. The base support member includes an upper handle lever pivot attachment point and a lower pivoting press lever pivot attachment point formed by holes in each base support member strip normal to the surface of the strips which are aligned with one another to support a holding member such as a pin or bolt extending through both of the rectangular strips.

The pivoting handle lever is defined by a longitudinal member having a distal end defining a handle grip and proximal end having a hole therethrough which is in alignment with and extends inbetween the upper attachment point of the base support member, so that the handle lever member is pivotally held inbetween the two strips of metal defining the support member.

A longitudinal pivoting press lever defining a long metal bar includes an end pivotally connecting to the lower pivoting press lever attachment point of the support member. A connecting rod means pivotally connects at or near the end of the distal end of the pivoting press lever for connecting the pivoting press lever to a medial portion of the handle lever. The pivoting press lever pivotally connects to the handle lever member at a selected attachment point between the inner end and the outer end of the lever member. The section of the pivoting connecting rod between the connecting rod and the support member is longer than the section of the handle lever between the connecting rod and the support member so that the connecting rod extends upward and inwardly back toward the short support member at an angle of ninety degrees or less preferably forming a acute angle thereinbetween. The attachment point of the preferred embodiment consists of aligned holes drilled in the horizontal plane normal to the surface of both the handle lever member and pivoting press lever and is connected together by a pin or bolt holding means. Several holes may be formed in either the lever or fulcrum member to provide leverage adjustments.

A fulcrum press member is pivotally attached to the underside of the pivoting press lever. The fulcrum press member of the preferred embodiment includes a holding means such as a pressure plate having a support member connecting means such as a pair of short horizontal metal strips or bars spaced apart extending upward therefrom and in alignment with one another. In the preferred embodiment, the bars are substantially rectangular in shape and include a plurality of holes spaced apart and in alignment with one another formed normal to the surface of the bars which are supported on their edges. The distal end of the bars are pivotally attached to the lower pivot attachment point of the pivoting press lever by a pin or bolt to defining a fulcrum. The fulcrum press member functions as a fulcrum point when the user pulls down on the pivoting handle lever so that the connecting rod exerts downward pressure against pivoting press lever and is used to hold the warped or curved workpiece against the surface of the cutting tool frame. Furthermore, the fulcrum press member biases the wood workpiece against the saw frame surface providing for means for obtaining a true and precision cut of the workpiece with a radial arm saw or other such cutting tool. Of course, the trueboard press may be used other saws such as a jig or manually held saw to provide a true cut having a precision depth.

The true board press may be used as a jig means to position and hold a first workpiece as a stop or guide means, wherein multiple work pieces may be positioned and cut in identical and exact dimensions. Furthermore, the true board press provides a means for positioning and holding a workpiece whereby several cutting, routing, or piercing, operations may be accomplished by merely changing the blade of the radial arm saw and maintaining the work piece in the stationary position, or stamping ("imprinting") by attaching a die to the bottom of the fulcrum press member. The trueboard press may also be used to hold a control board in position to provide a guide of stop means as a standard reference to cut other boards. The true board press is an especially important tool to hold a workpiece in position in order for the user to use both hands to guide and operate the radial saw, router, or other cutting means, and prevent the blade from "running" or "walking" upon the surface of the board when cutting a dado or the like. Thus, the true board press provides an added measure of safety when used in combination with a radial cutting means.

BRIEF DESCRIPTION OF THE DRAWINGS

A better understanding of the present invention will be had upon reference to the following description in conjunction with the accompanying drawings in which like numerals refer to like parts throughout the several views and wherein.

SPECIFICATION

The true board press of the present invention is manufactured from readily available materials and simple in design. The preferred embodiment is comprised of metal, more particularly steel; however, it is contemplated that aluminum, wood, fiberglass, plastic, polymer composite materials, or combinations thereof could be used in combination with or substituted for the steel components of the present invention.

Figure 1:
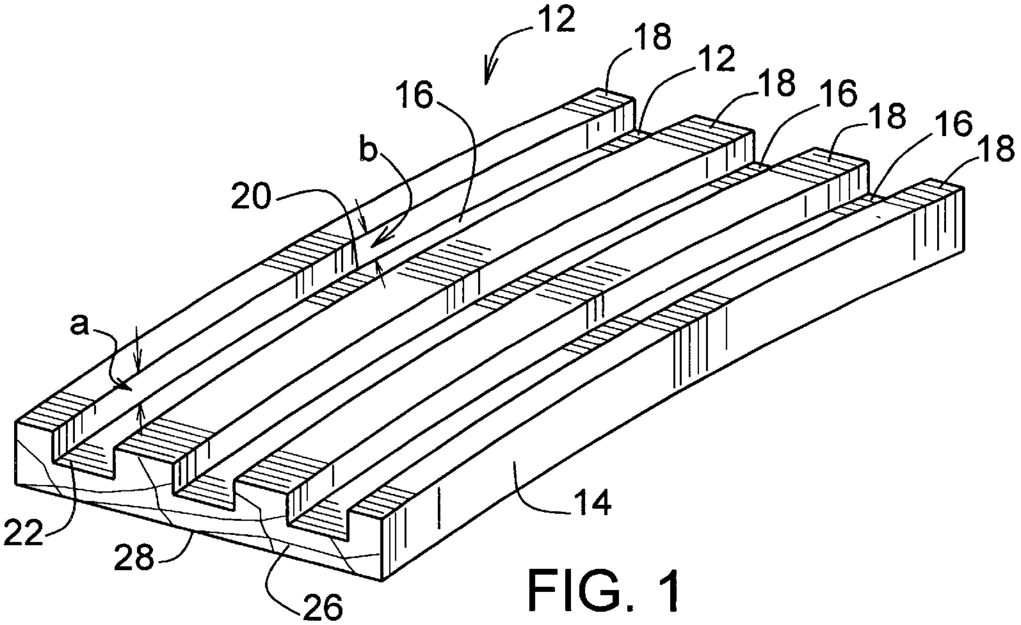
FIG. 1 is a perspective view of a wood work piece cut using a radial saw without the true board press of the present invention showing the center portions of the grooves being cut at a deeper depth than the ends of the groove due to the upward bow in the wood work piece.
Figure 2:
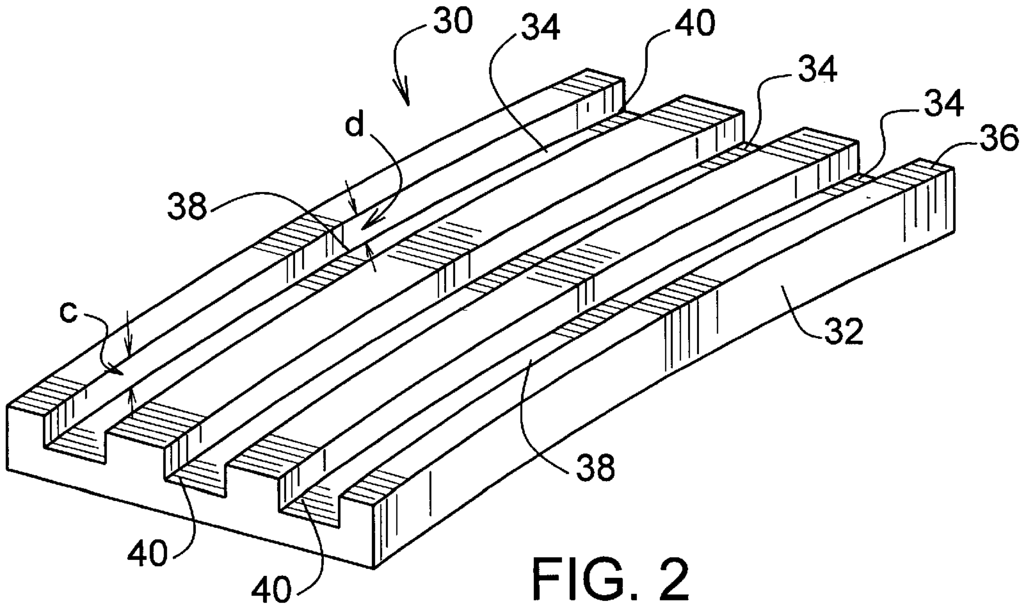
FIG. 2 is a perspective view of a wood work piece cut using a radial saw with the true board press of the present invention showing the center portions of the grooves being at an equal depth as compared with the ends of the groove as a result of the use of the true board press to depress of the upward bow during the sawing process in the wood work piece.
Figure 3:
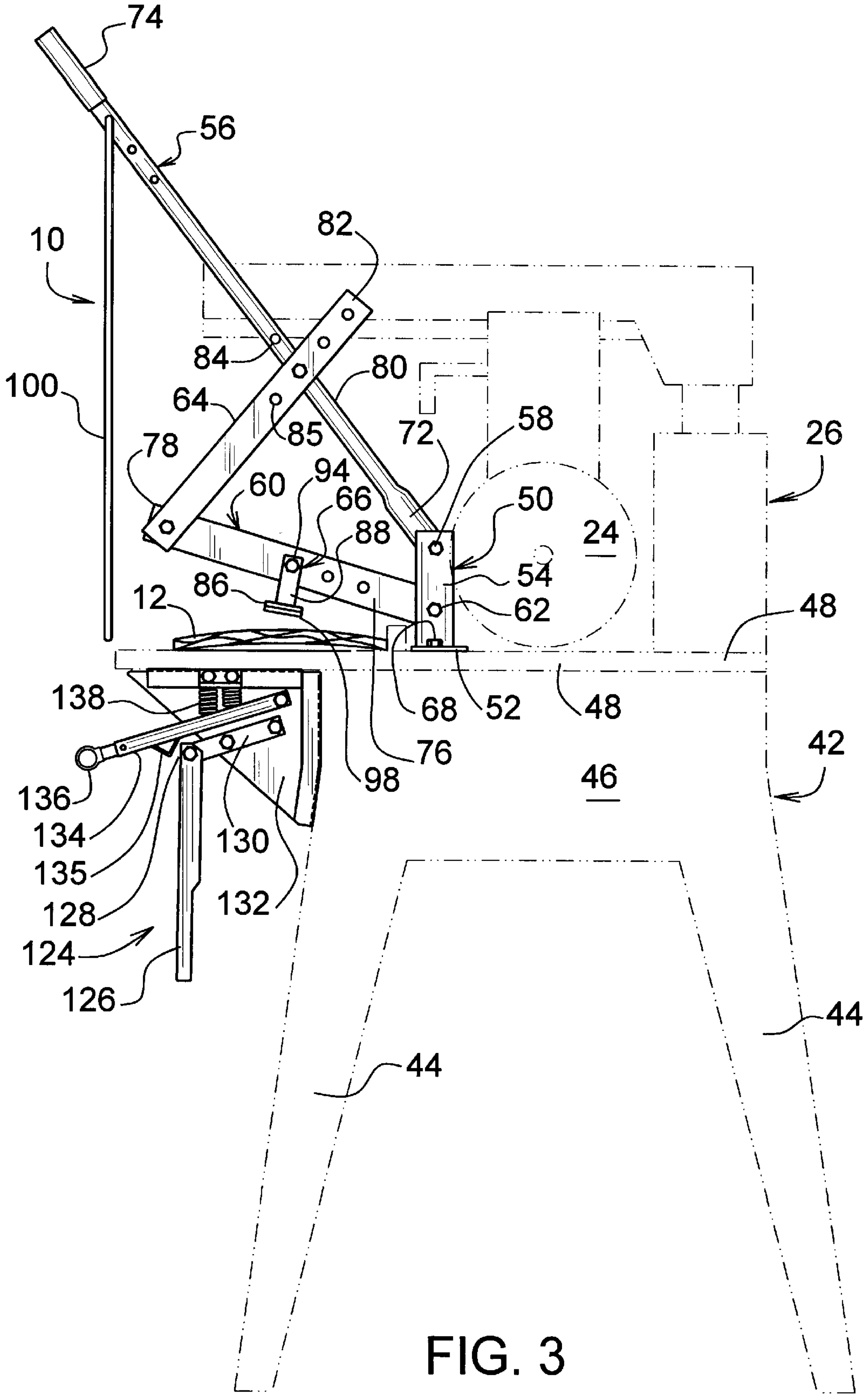
FIG. 3 is a side view of the present invention showing a bowed wood work piece positioned upon the saw support table surface and centered with respect to the saw below the fulcrum press member of the true board press.
Figure 4:
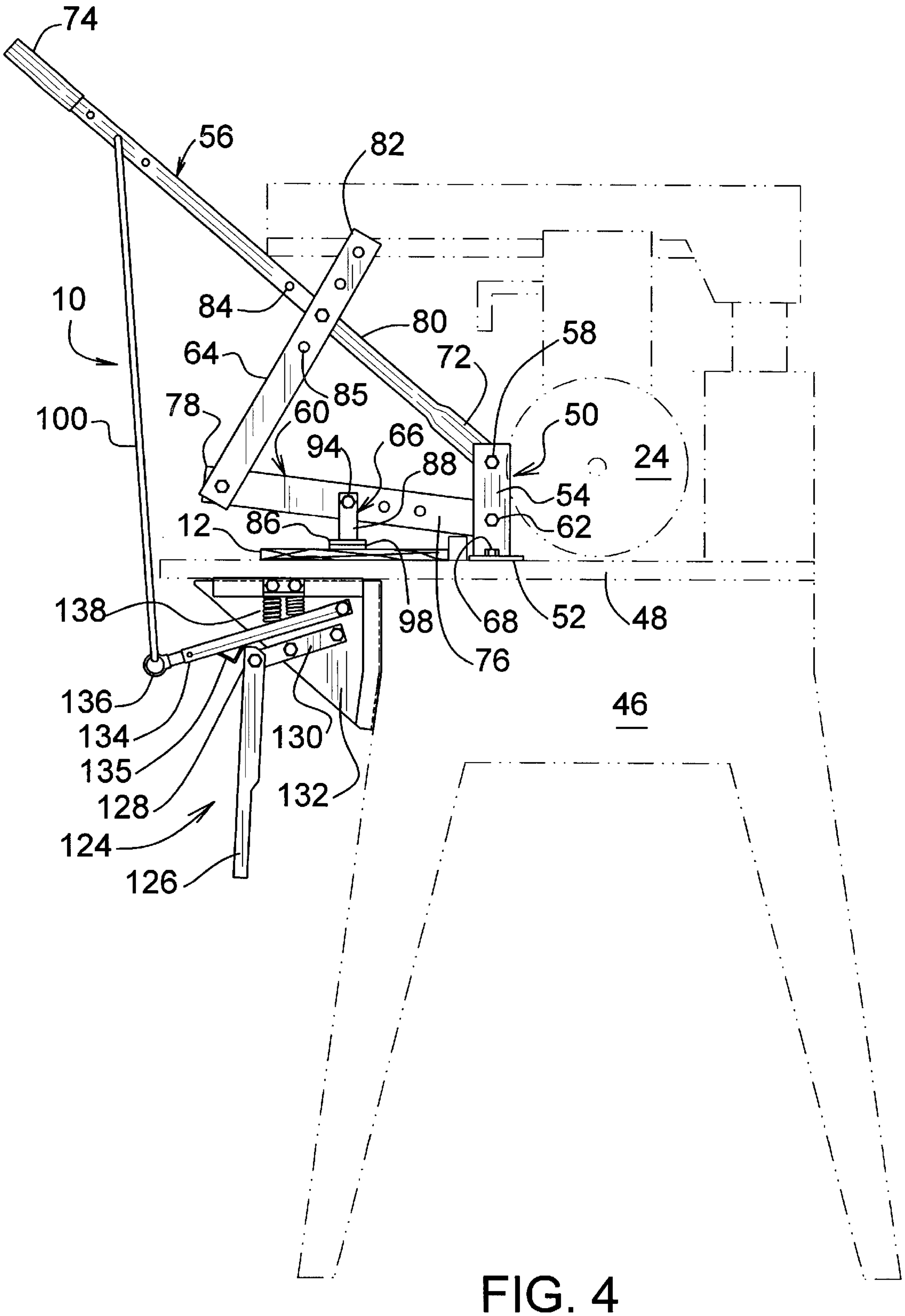
FIG. 4 is a side view of the true board press shown in FIG. 3, showing the radial table saw in phantom lines and showing the straightening of a bowed wood work piece depressed by biasing the fulcrum press member with the handle being locked into position with the locking device.
Figure 5:
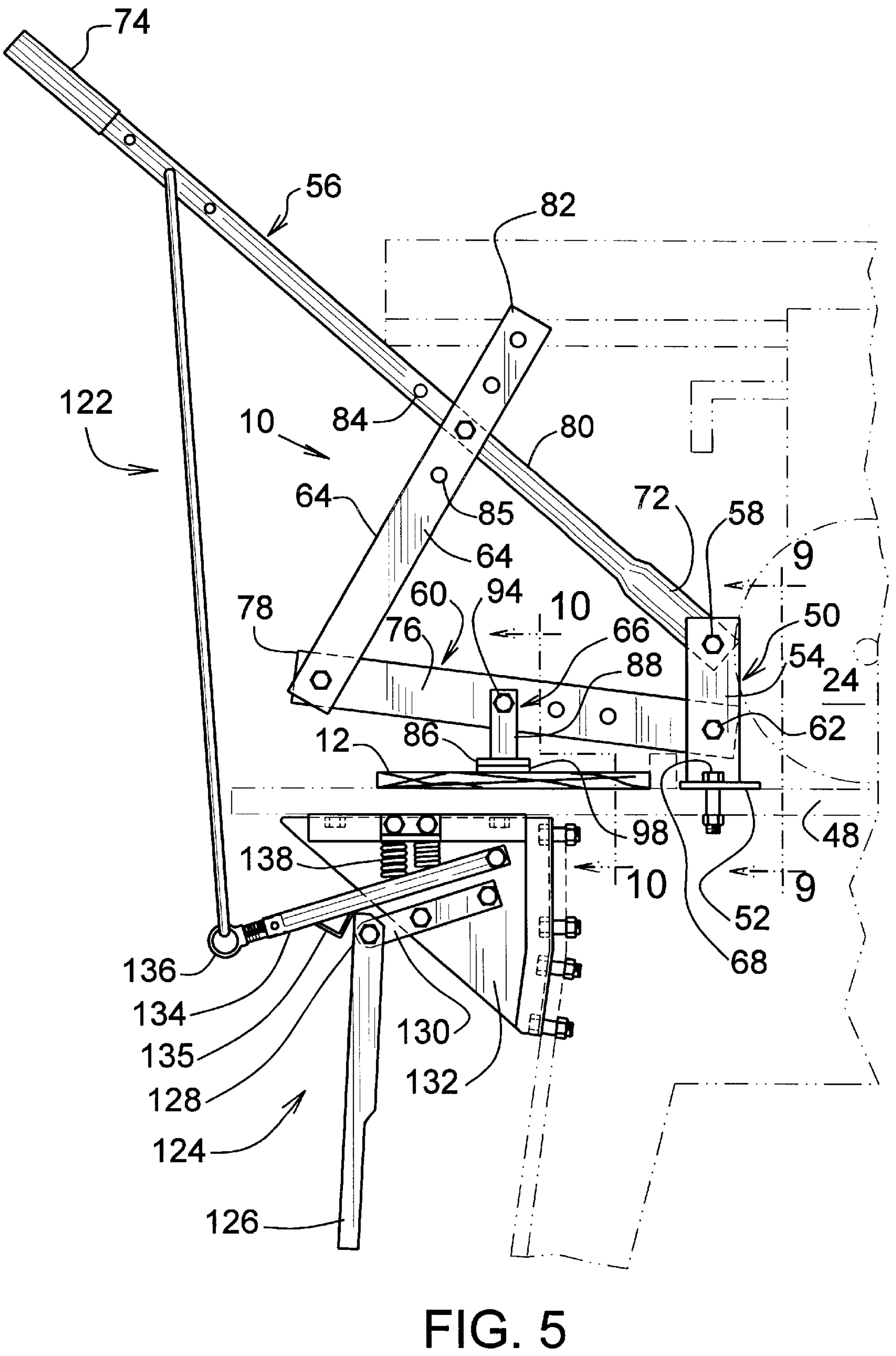
FIG. 5 is an enlarged side view of FIG. 4 for better showing the details of the locking mechanism.

Referring now to the drawings, FIGS. 1 and 2 show how the true board press provides a true cut using wood work products. FIG. 1 shows a first wood work product 12 consisting of a section of a bowed board 14 having a plurality of longitudinal spaced apart parallel grooves 16 cut into the upper surface 18 of the bowed board 14. Use of the radial saw cuts grooves 16 into the surface 18 of the board 14 a deeper depth at the groove center portion 20 than at the groove ends 22, so that the depth distance "a" at the groove ends 22 is less than the depth distance "b" at the groove center portions 20 because the saw blade 24 of the radial saw 26, (shown in FIGS. 3–6), cuts a straight preset depth along a selected horizontal plane through the upwardly curved or "bowed" plank 14. When securing means such as, dowel pegs, nails, screws, or glue are used to secure the grooved board 14 into cooperative engagement with a matching plane spaces are left between the boards because of the unequal depth of the grooves 16 and/or insertion of the board into a mating precut piece results in a poor fit. Moreover, upon secure attachment the board may be too long in the flat position for it is difficult to obtain a true measurement of a curved board. Furthermore, upon attachment the board 14 may be stressed and create stress lines or cracks 28 upon being forced into compliance and close tolerance with a mating board by use of securing means.

As shown in FIG. 2, use of the true board press 10, as best shown in FIGS. 3–8, provides a means for obtaining a true precision cut through curved or warped materials such as wood work products. FIG. 2 shows a second wood work product 30 consisting of a section of bowed board 32 having a plurality of longitudinal spaced apart parallel grooves 34 cut into the upper surface 36 of the board 32, wherein the grooves were cut into the board 32 held in a flattened position by the true board press 10. Use of the true board press 10 to depress the bowed board 32 and hold the board 32 flat against the surface of the radial saw support stand frame permits the radial saw to cut grooves 34 into the surface 36 of the board 32 at the same selected depth at the groove center portion 38 than at the groove ends 40, so that the distance "c" is equal to the distance "d". Using the true board press 10, provides a means to hold the bowed board 38 in a flat position so that the saw blade 24 of the radial saw 26, (shown in FIGS. 3–6), cuts a straight preset depth along a selected horizontal plane through the "flattened" bowed board 38. securing means such as wood dowels, biscuits, staples, nails, screws, or glue are used to secure the grooved board 38 into cooperative engagement with a matching board. Because the grooves 34 are of equal depth, no spaces are left between the boards being cooperatively fixed together. Moreover, measurements of the boards are determined with more accuracy and the lengths of the board and even the end cut or bevel may be cut with precision. The uniform depth of the grooves eliminates the stress placed upon the secured board 38 due to improper sizing and eliminates the need for forcing "a bowed board 38 into compliance and close tolerance with a mating board by use of securing means. Relieving the stress of fitting boards together having close tolerances such as for doll houses or furniture is very important in order to provide a high quality product which will have a long duration and good fit and finish due to the elimination of the stress associated with securing nonconforming pieces.

As best shown in FIGS. 3–8, the preferred embodiment of the present invention defines a trueboard press 10 for a saw, router, or other cutting tool device utilizing a rotating blade for cutting thorough or into the surface of a workpiece such as a sheet or longitudinal member comprising plastic, metal, wood, or combinations thereof. More particularly, the present invention defines a true board press for use with a conventional radial arm saw. Shown in phantom lines the radial arm saw 26 consists of a support stand or frame 42, having a plurality (usually four) legs 44 supporting a generally flat and level table portion 46 having a surface 48 with apertures, slits, and grooves formed therethrough in order to accommodate the blade 24 of a saw, a router, bit, drill, or other cutting or piercing device.

Figure 9:
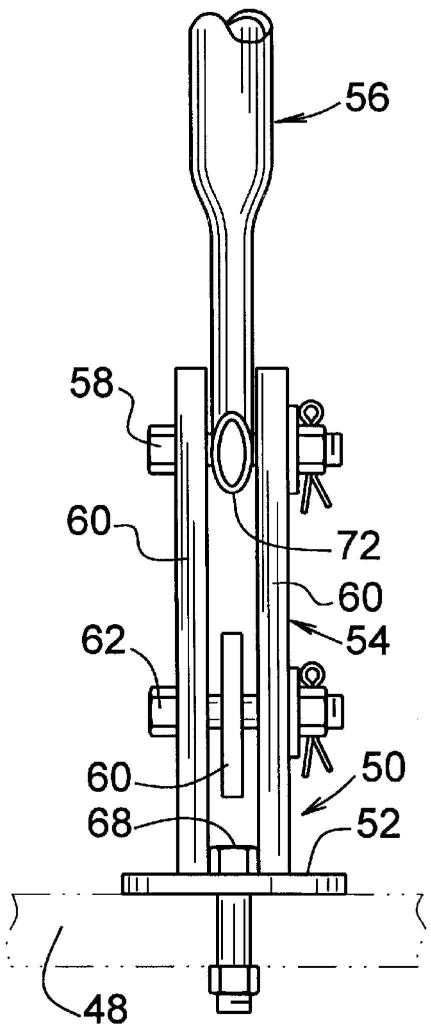
FIG. 9 is a sectional view along lines 9—9 of FIG. 5, showing the attachment of the locking device to the radial saw frame shown in phantom lines, and the attachment of the true board press to the saw frame.

The preferred embodiment for the trueboard press 10 comprises a secured base member 50 defining an attachment plate 52 and a short vertical support member 54 extending upwardly therefrom. A handle lever 56 extends from an upper pivot attachment point 58 defining a hole at the top of the vertical support member 54. A pivoting press lever 60 extends from a lower pivot attachment point 62 defining a hole at the bottom of the vertical support member 54. A connecting rod 64 adjustably attaches the handle lever 56 to the pivoting press lever 60 which has a fulcrum press member 66 extending downwardly therefrom for holding pressure against a piece of wood for flattening the piece of wood between the fulcrum press member 66 and the saw support frame surface 48 correcting any warpage thereof in order to make a true and precision cut for obtaining accurate dimensions. One preferred embodiment is described in more detail hereafter:

The secured base member 50 includes a flat attachment plate 52 secured to the surface 48 of the saw frame 46. The attachment plate 52 has at least one support member 54 extending upwardly therefrom in a vertical manner generally perpendicular to the attachment plate 52. The base 50 is secured to the saw table surface 48 by holding means such as a one of more bolts 68, preferably in a rotatable manner. A single bolt may be used to secure the base 50 to the table frame providing a means to rotate or swing the entire trueboard press 10 out of the way in order to place or position a workpiece on the table or for cutting applications not requiring the trueboard press 10. The support member 54 may be welded or bolted to the attachment plate 52 or formed integrally therewith such as by molding aluminum or plastic components. As best illustrated in FIG. 9, the support member 54 of one preferred embodiment defines a pair of rectangular strips 60 of metal spaced apart in alignment with one another forming a fork thereinbetween. The support member 54 defines an upper attachment point 58 and a lower pivot attachment point 62 formed by at least two sets of holes formed in each support member strip 60 normal to the surface thereof in alignment with one another to support a holding member such as a pin or bolt 70 extending through both of the rectangular strips 60 to secure the proximal end 72 of the pivoting handle lever 56 thereinbetween. It is contemplated that the base member 50 be designed having a single vertical support member 54 for cooperative engagement with a pivoting handle member 56 having a forked distal end.

The pivoting handle lever 56 includes a distal end 74 defining a handle grip extending upwardly and outwardly pass the saw frame 46. The pivoting handle lever 56 includes a pivoting inner end 72 having a hole therethrough which is in cooperative engagement with and extends from the upper pivot attachment point 58 of the support member 54, so that the end of the pivoting handle lever 56 is pivotally held inbetween the two strips of metal 60 defining the support member 54.

Figure 8:
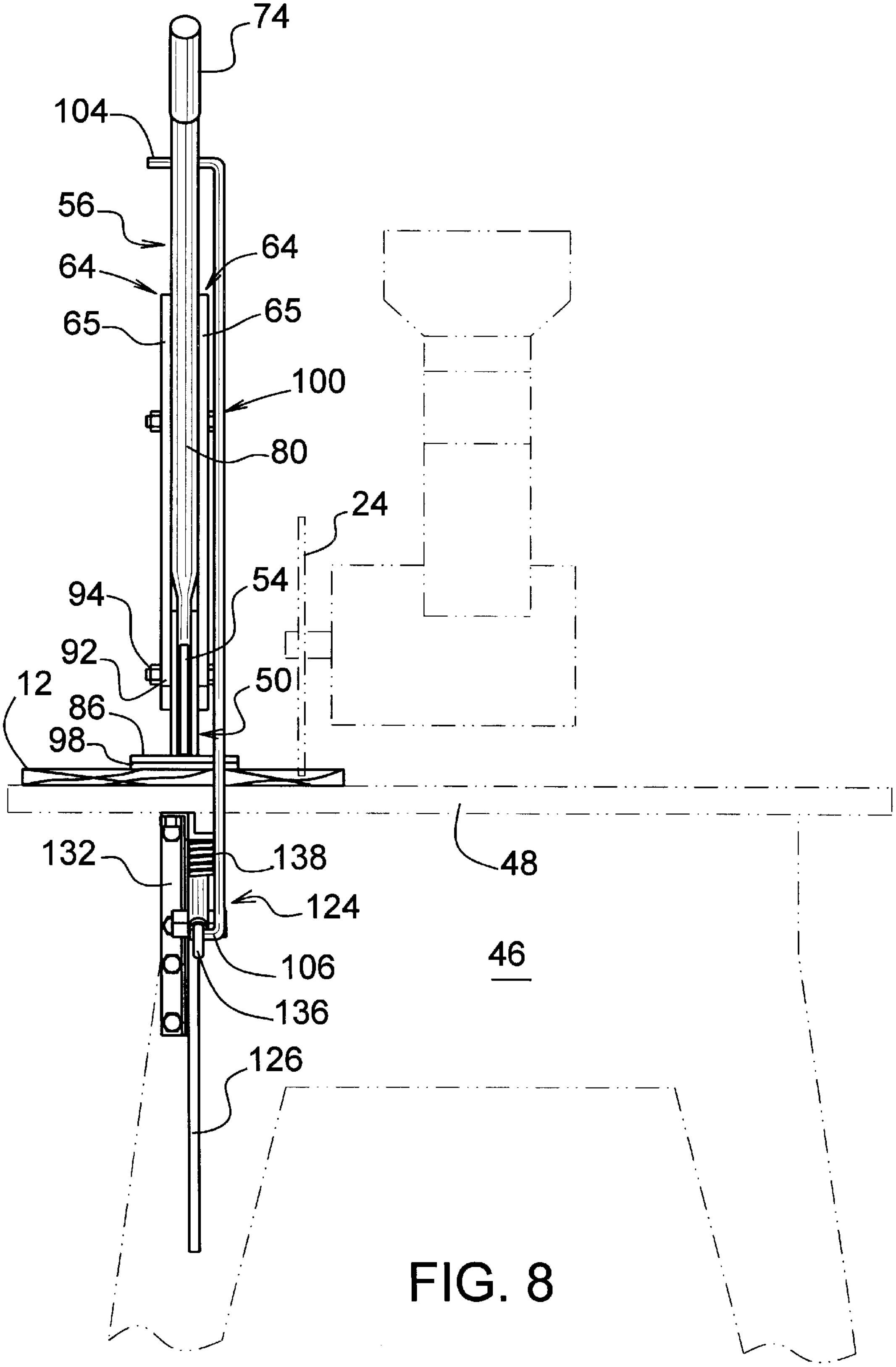
FIG. 8 is a front end view of the true board press of FIG. 3, showing the saw frame in phantom lines.

A longitudinal pivoting press lever(s) 60 defining one or more long metal bars includes an inner end 76 pivotally connecting to the lower pivoting press lever attachment point 62 of the support member 54. A connecting rod 64 comprising a pair of longitudinal bars 65, (as best shown in FIG. 8), pivotally connects at or near the distal end 78 of the pivoting press lever 60 to connect the pivoting press lever 60 to the medial portion 80 of the pivoting handle lever 56. Of course, a single bar, or bar having forked ends could also be substituted therefor. The pivoting press lever 60 pivotally connects to the pivoting handle lever 56 at a selected attachment point between the inner end 76 and the distal end 78 of the pivoting press lever 60. The section of the pivoting connecting rod 64 between the connecting rod 64 and the base support member 54 is longer than the section of the pivoting handle lever 56 between the pivoting connecting rod 64 and the base support member 54 so that the connecting rod 64 extends upward and inwardly back toward the short base support member 50 at an angle of ninety degrees or less preferably forming a acute angle thereinbetween. One or more holes 84 are formed in both the medial section 80 of the pivoting handle lever 56 for cooperative engagement with holes 85 in the upper end 82 of the connecting rod(s) 64 to provide for leverage adjustments and travel length adjustments.

A fulcrum press member 66 is pivotally attached to the underside of the pivoting press lever 60. The fulcrum press member 66 of the preferred embodiment comprises a pressure plate 86 and a short support member 88 extending upwardly therefrom in a vertical manner generally perpendicular to the pressure plate 86. The fulcrum support member 88 may be welded or bolted to the pressure plate 86 or formed integrally therewith such as by molding aluminum or plastic components. The fulcrum support member 88 may also be pivotally connected to the pressure plate 86. As best illustrated in FIG. 9, the fulcrum support member 88 of one preferred embodiment defines a pair of rectangular strips 90 of metal spaced apart in alignment with one another forming a channel or fork thereinbetween. The fulcrum support member 88 defines an upper attachment point 92 formed by one or more holes formed in each support member strip 90 normal to the surface thereof in alignment with one another to support a holding member such as a pin or bolt 94 extending through both of the rectangular strips 90 to secure the fulcrum support member 88 to the pivoting press lever 60 in cooperative engagement therewith. It is contemplated that the fulcrum press member 66 could be designed having a single vertical support member 90 for cooperative engagement with a pair of pivoting press levers 60. The pivoting press lever 60 includes a plurality of adjustment points formed by holes 96 therethrough for positioning of the fulcrum press member 66. More than one fulcrum press member 66 may be used at selected positions depending upon the size and length of the workpiece to be compressed; however, one press member 66 is usually sufficient for most applications. A pad 98 formed of rubber, soft wood, or some other nonabrasive friction enhancing material may be secured to the underside of the pressure plate 86 to enhance the grip of the fulcrum press member 66 and/or to reduce vibration from the wood working operation. A metal plate having flanges bent upwardly and inwardly may provide a slide cover to slide around the press pad providing a hard surface for selected pressing applications.

Figure 7:
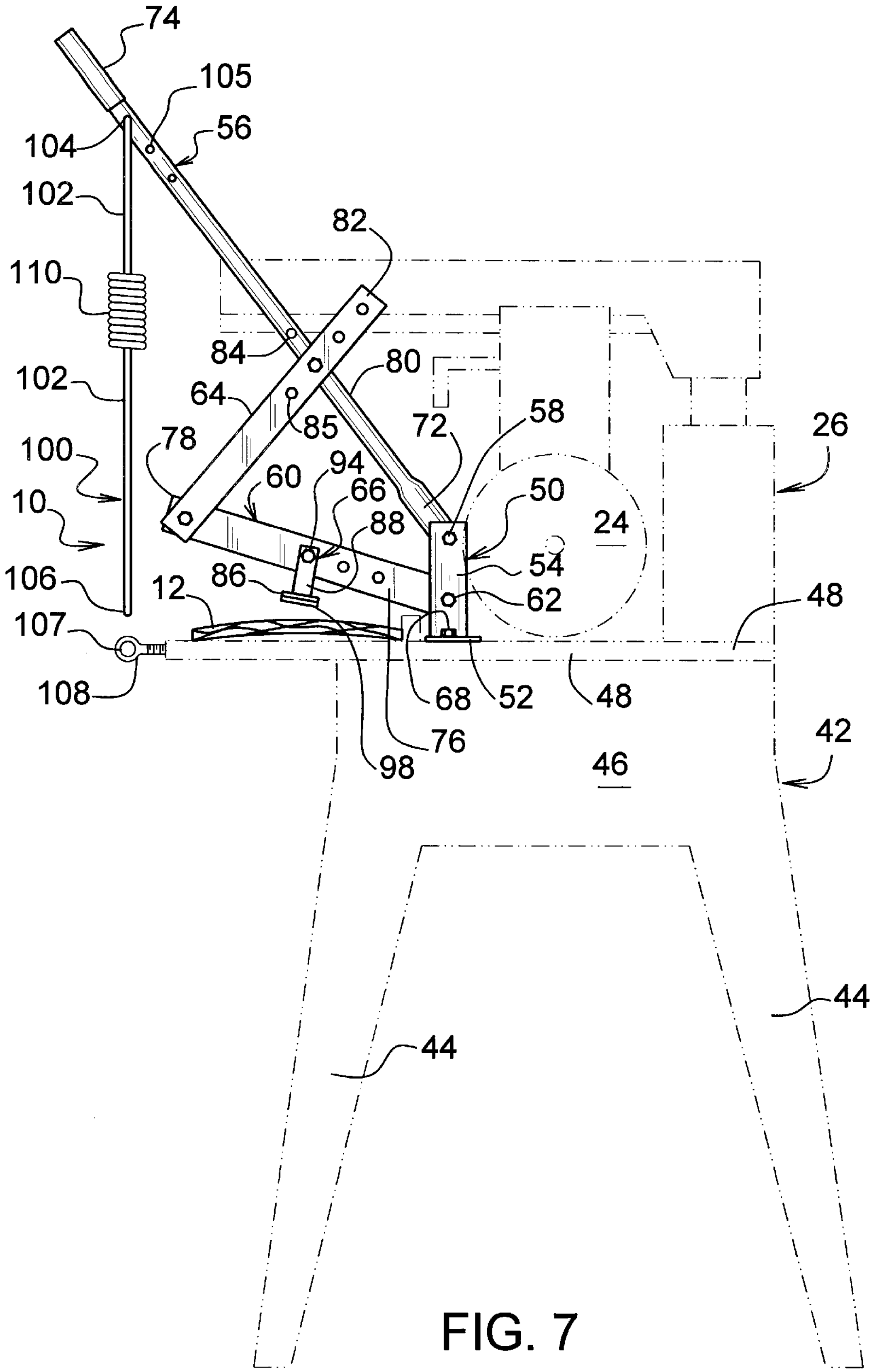
FIG. 7 is a side view of the true board press showing a holding loop means extending from the radial saw table frame for cooperative engagement with spring-loaded rod.

As shown in FIG. 7, the handle lever 56 may be pulled down to exert pressure on fulcrum press member 66 to flatten the workpiece 12 therebelow. A hold-down rod 100 includes a longitudinal main body portion 102, a first distal end 104 bent normal to the longitudinal axis of the main body portion 102 for cooperative engagement with a holding means such as a hole 105 formed in the handle lever 56, a second distal end 106 bent normal to the longitudinal axis of the main body portion 102 for cooperative engagement with a holding means such as a hole or loop 107 formed in a swivel hook 108 extending from the frame 48 of the work bench, and a spring means 110 exerting force along the longitudinal axis of the hold-down rod 100. After pulling the handle lever 56 downward exerting pressure on the fulcrum press member and the workpiece held thereby, the insertion of the second distal end 106 into the swivel hook 108 holds the workpiece in the desired position due to the tension on the spring means 110. Of course different size spring means 110 may be used depending upon the downward force needed for a particular application. The spring means 110 may be formed integrally with the hold-down member 100 or provided as an independent member for insertion between the hold-down member 100 and the swivel hook 108 or handle lever 56. It should also be noted that the swivel hook 108 may be screwed into the frame 46 or a threaded sleeve held thereby, or held in a slidable sleeve by a holding means such as a set screw in order to provide a means to shorten or lengthen the distance the loop 107 is positioned with respect to the frame 46. Preferably, the hold-down rod 100 remains positioned in the vertical axis. After completion of the cutting of the workpiece 12, the distal end 106 of the hold-down rod 100 is disengaged and the trueboard press 10 is rotated ninety degrees about the attachment bolt 68 of the base 50 out of the way of the user.

Figure 6:
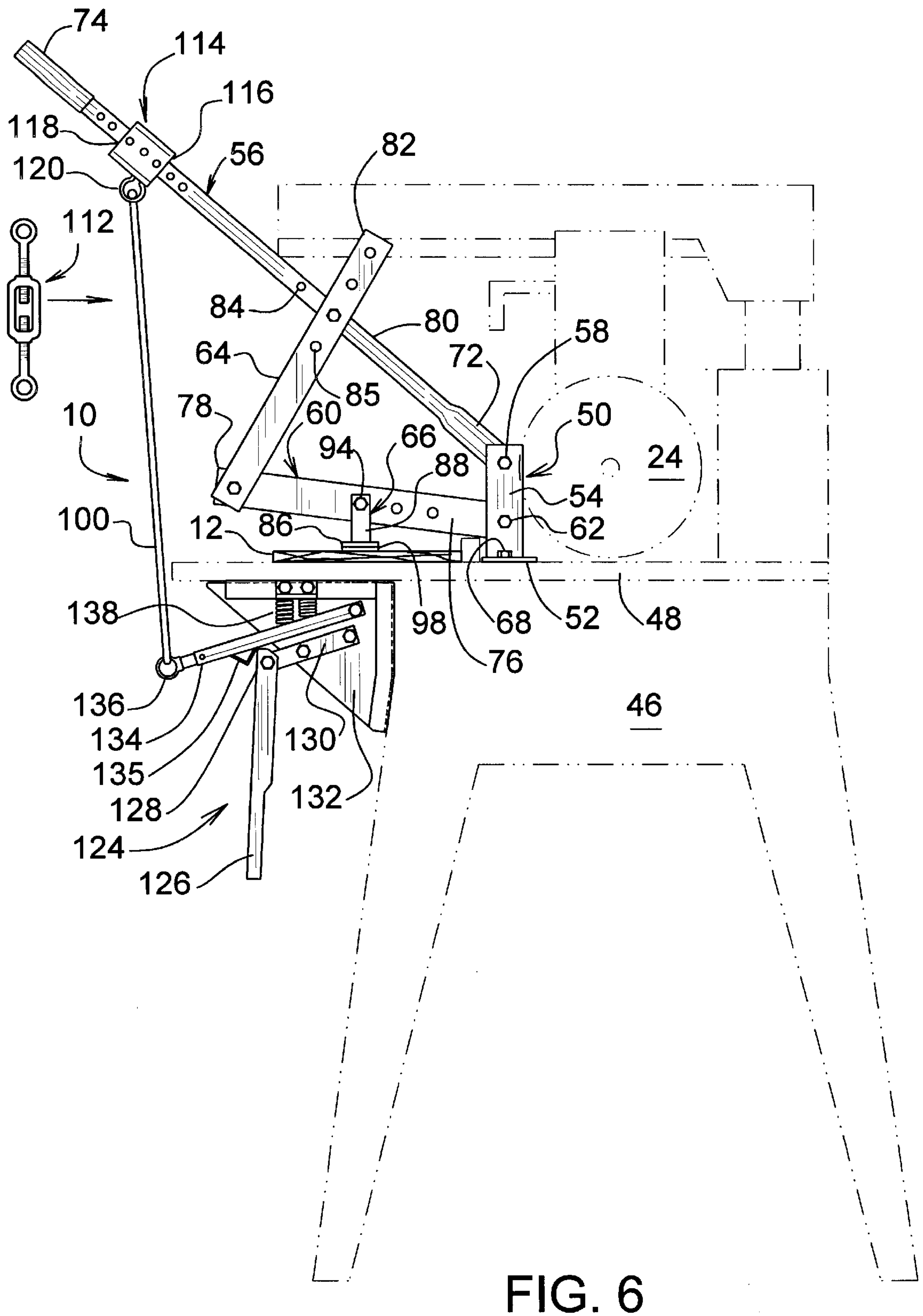
FIG. 6 is side view of the true board press showing an adjustable slide means to vary the position of attachment of the connecting rod to the handle lever.
Figure 11:
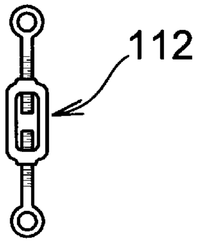
FIG. 11 is a side view of a turnbuckle which may be used in combination with the hold-down rod to vary the length of travel of the hold-down rod depending upon the thickness of the workpiece.
Figure 10:
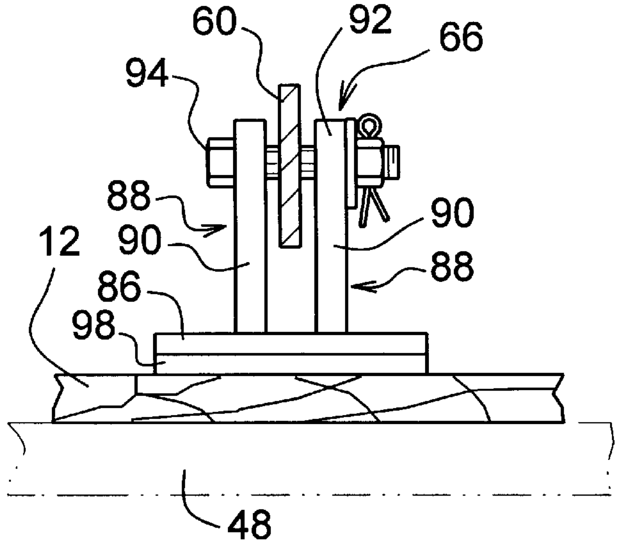
FIG. 10 is a sectional view along lines 10—10 of FIG. 5, showing the straightened bowed work piece held into position between the fulcrum press member and the surface of the saw frame shown in phantom lines.

As shown best in FIGS. 6 and 11, a turnbuckle 112 may be used in combination with the hold-down rod 100 between the handle lever 56 and swivel hook 108 to adjust the length thereof.

FIG. 6 further shows an adjustable handle slide 114 consisting of a sleeve 116 having one or more holes 118 therethrough for cooperative engagement with the holes 105 formed in the handle lever 56 and having a holding means such as a loop or swivel hook 120 extending downwardly therefrom for cooperative engagement with the distal end 104 of the hold-down rod 100 for providing a means for adjustment of the length of travel depending on the thickness of a workpiece and/or to provide a means for maintaining the vertical position of the hold-down rod 100.

As shown in FIGS. 3–6, and 8, one preferred embodiment of the present invention utilizes a locking device 122 as a safety feature. The locking device 122 comprises a latch assembly 124 for use in combination with the hold-down rod 100 and the embodiments thereof described heretofore. The latch assembly 124 comprises a pivoting handle 126 pivoting linked near its proximate end 128 to a stationary longitudinal attachment member 130 defining a strip of metal which is secured to a frame extension member defining a triangular plate 132 by attachment means such as bolts. The strip of metal 130 could also be attached to the frame 46 of the saw. The triangular plate defining the frame extension member 132 is shaped to fit underneath the work surface and provide structural support yet not interfere with the pivoting action of the handle 126 or operation of the equipment with the user. The triangular plate 132 includes a rear channel surface which abuts the saw frame 46 and a top channel surface which abuts the underside of the saw table. A longitudinal pivoting leverage bar 134 defining an adjustable length holding means having a swivel loop 136 protruding from the distal end is pivotally connected and spaced above and in generally parallel alignment with the stationary longitudinal member 130. The longitudinal pivoting leverage bar 134 includes a fulcrum member 135 extending downwardly from about the midsection for cooperative engagement with the proximate end 128 of the handle 126. Means for biasing defining one or more stiff coil springs 138 are attached to the top channel of the triangular plate 132 and extend downwardly contacting the pivoting leverage bar 134. Raising the handle 126 upward causes the distal end 128 to pivot on the fulcrum member 135 compressing the coil springs 138 so that the swivel loop 136 is forced upwardly to meet and engage the distal end 106 of the hold-down rod 100 which may be inserted into the loop 136 linking the lever assembly 124 and press handle 56 to maintain the desired amount of pressure for holding and flattening the wood workpiece 12. The handle 126 may then be released into a resting position.

A turnbuckle 112 may be used in combination with the hold-down rod 100 between the handle lever 56 and swivel hook 108 to adjust the length thereof. Furthermore, an adjustable handle slide 114 consisting of a sleeve 116 having one or more holes 118 therethrough for cooperative engagement with the holes 105 formed in the handle lever 56 may be used for length adjustment. As noted previously, the handle lever 56 may include a holding means such as a loop or swivel hook 120 extending downwardly therefrom for cooperative engagement with the distal end 104 of the hold-down rod 100 for providing a means for adjustment of the length of travel depending on the thickness of a workpiece and/or to provide a means for maintaining the vertical position of the hold-down rod 100.

The foregoing detailed description is given primarily for clearness of understanding and no unnecessary limitations are to be understood therefrom, for modifications will become obvious to those skilled in the art based upon more recent disclosures and may be made without departing from the spirit of the invention and scope of the appended claims.

I claim:

1. A trueboard press for use with a cutting device, comprising:

a base having a support member extending upwardly therefrom, said support member having an upper pivot attachment point and a lower pivot attachment point;

a handle lever having a distal end defining a grip, an inner end pivotally connecting to said upper attachment point of said support member, and a medial portion therein-between;

a pivoting press lever having a distal end and an inner end, said inner end pivotally connecting to said lower pivot attachment point of said support member;

a connecting rod pivotally connecting said distal end of said pivoting press lever with said medial portion of said handle;

whereby a portion of said pivoting press lever between said connecting rod and said support member is of a shorter length than said longitudinal pivoting press lever thereby extending the connecting rod upwardly and inwardly back toward the base support member at an acute angle of less than ninety degrees; and a fulcrum press member including a pressure plate and a support member extending upwardly therefrom pivotally connecting to said pivoting press lever for biasing a workpiece against a frame surface flattening and holding said workpiece providing for a true and precision cut of said workpiece with said radial arm saw.

2. The trueboard press of claim 1, wherein a die is attached to said fulcrum press member for stamping an imprint into a work piece.

3. The trueboard press of claim 1, wherein said base is secured to a support frame by a holding means providing rotation therearound.

4. The trueboard press of claim 1, including a least two fulcrum support members spaced apart from one another at selected positions.

5. The trueboard press of claim 1, wherein said fulcrum press member includes friction enhancing material.

6. The trueboard press of claim 5, wherein said friction enhancing material is selected from the group consisting of rubber, softwood, and a metal plate.

7. The trueboard press of claim 6, wherein said metal plate includes a pair of side flanges defining a slide cover for slidably securing to said fulcrum press member.

8. The trueboard press of claim 1, including a hold down rod for cooperative engagement with said handle lever and said support frame.

9. The trueboard press of claim 8, including a biasing means for exerting force on said hold down rod.

10. The trueboard press of claim 9, wherein said biasing means is a spring.

11. The trueboard press of claim 8, including a turnbuckle in cooperative engagement with said hold down rod for adjusting the length of said hold down rod.

12. The trueboard press of claim 8, including a means for locking said hold down rod in position.

13. The trueboard press of claim 12, wherein said locking device comprises a latch assembly having a pivoting handle linking to a stationary longitudinal attachment member secured to said support frame.

14. The trueboard press of claim 13, including longitudinal pivoting leverage bar cooperatively engaging at least one spring biasing said pivoting handle.

15. The trueboard press of claim 13, including an adjustable handle slide comprising a sleeve slidably secured to said handle lever, said adjustable handle slide including a means for attachment of said hold down rod.

* * * * *